Oct. 3, 1950          K. T. ROMIE          2,524,359
BLOCK FORMING MACHINE
Filed July 15, 1946          4 Sheets-Sheet 2
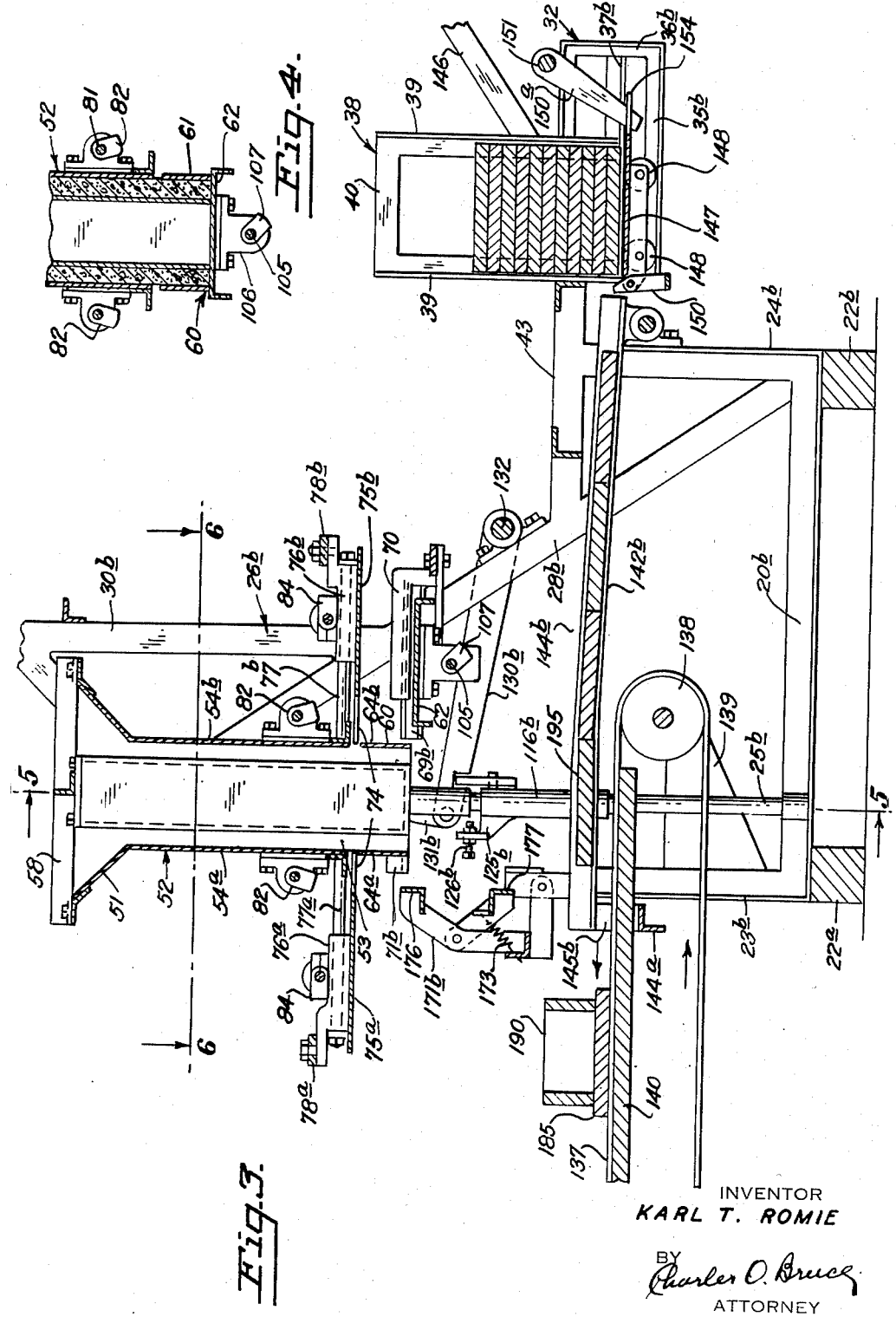
INVENTOR
*KARL T. ROMIE*
BY *Charles O. Bruce*
ATTORNEY

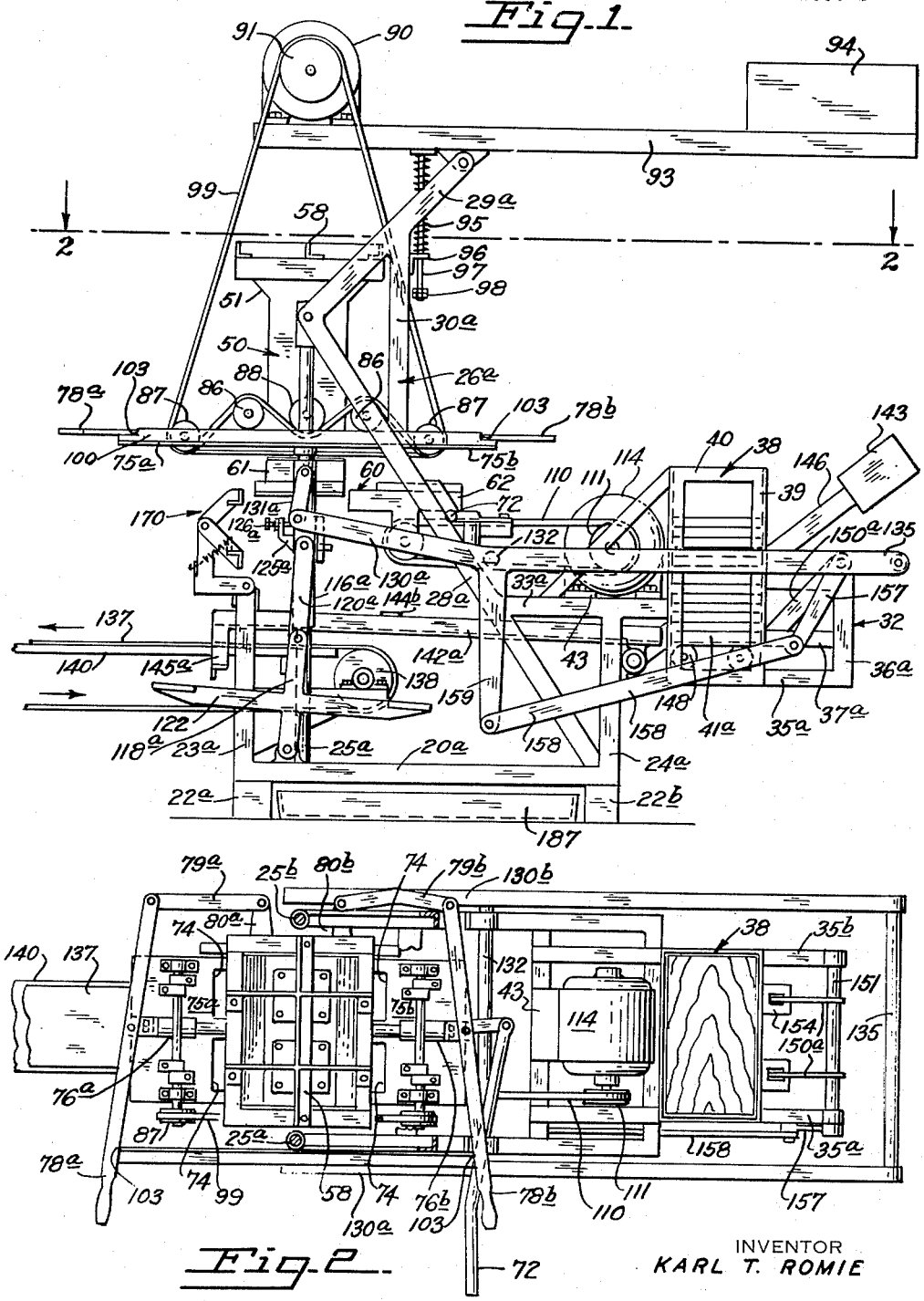

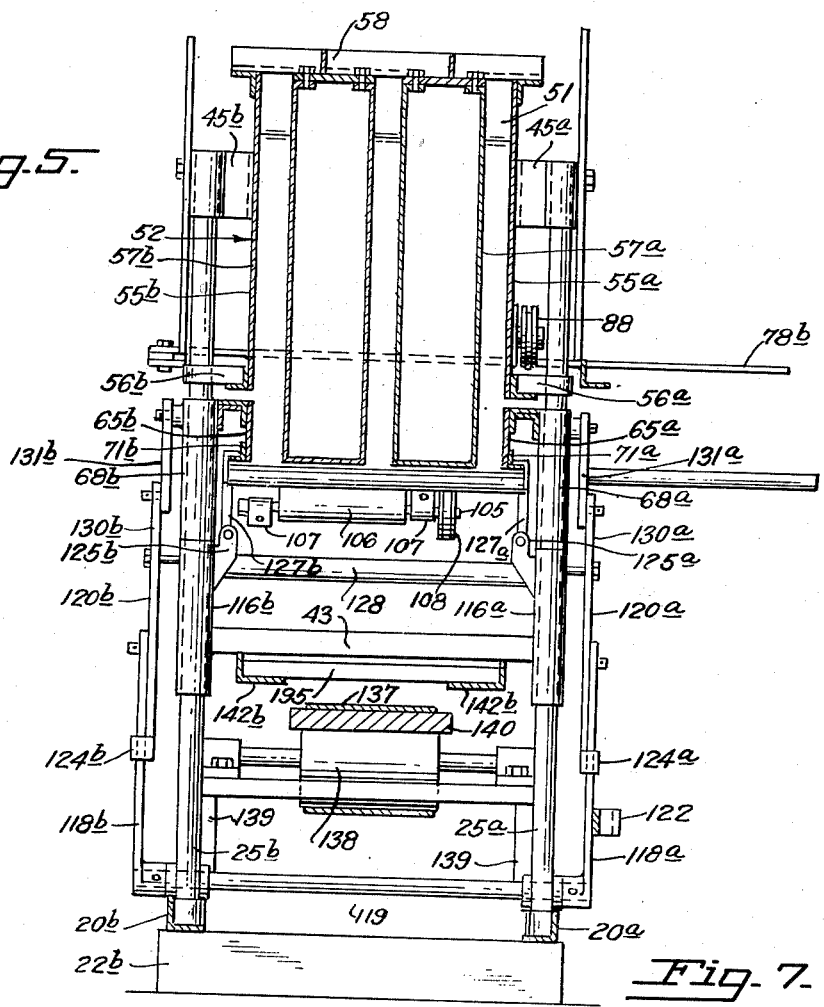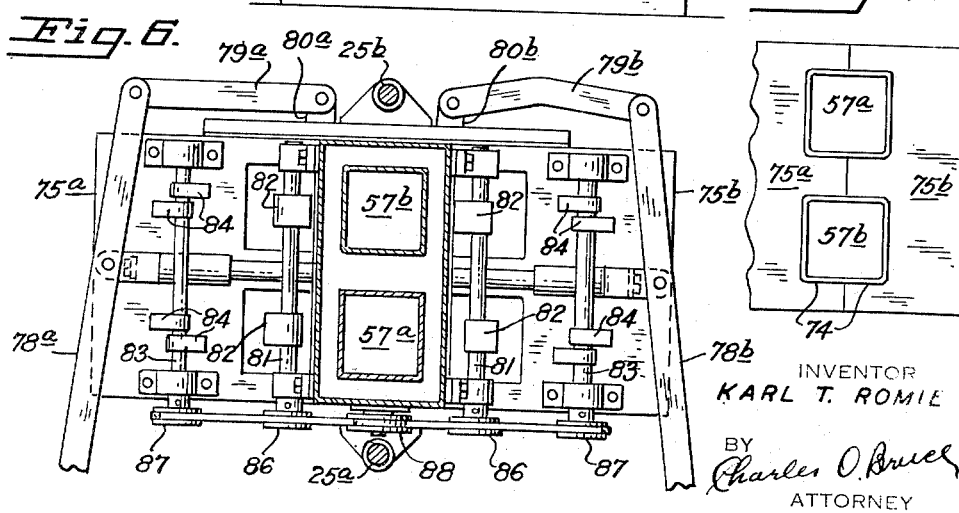

Oct. 3, 1950 K. T. ROMIE 2,524,359
BLOCK FORMING MACHINE
Filed July 15, 1946 4 Sheets-Sheet 4

INVENTOR
KARL T. ROMIE
BY Charles O Bruce
ATTORNEY

Patented Oct. 3, 1950

2,524,359

UNITED STATES PATENT OFFICE 2,524,359

BLOCK FORMING MACHINE

Karl T. Romie, Oakland, Calif.

Application July 15, 1946, Serial No. 683,737

3 Claims. (Cl. 25—41)

My invention relates to the manufacture of hollow bricks or the like and more particularly to improved machinery for the manufacture thereof.

The phrase "hollow brick" as used herein designates a brick provided with passages extending therethrough, and more particularly refers to bricks which are formed by molding a plastic material, such as cement or concrete, in a mold form having a core disposed therein.

In the manufacture of hollow brick from concrete, it is customary to utilize a mold form having a core therein and to pour concrete into the space in the form around the core, and then to compact the concrete in the mold such as by vibrating the mold with the concrete mix therein. The brick unit thus formed is thereafter removed from the mold and permitted to harden by drying. By means of this procedure, it is possible to manufacture hollow brick of any desired shape having passages extending therethrough.

An object of my invention is to provide an improved machine for manufacturing hollow brick.

Another object of my invention is to provide a machine of the type described with means for compacting cementitious material before feeding it into a brick mold.

Another object of my invention is to provide a machine of the type described with means for preshaping cementitious material before feeding it into a brick mold.

A further object of my invention is to provide a machine of the type described with means for feeding preformed cementitious material into a mold and then cutting off a predetermined portion thereof to form a hollow brick of predetermined dimensions.

A still further object of my invention is to provide in a machine of the type described, an improved means for making a series of hollow brick and discharging them in sequence onto a series of platens.

My invention possesses many other objects and advantages, some of which, together with the foregoing, will be set forth in the following description of a specific embodiment thereof. In the drawings:

Figure 1 is an elevational view of a brick making machine incorporating features of the present invention;

Figure 2 is a plan view of the brick making machine of Figure 1 taken on the line 2—2 of Figure 1;

Figure 3 is an elevational view, partly in section, of the brick making machine of Figure 1;

Figure 4 is an elevational view, partly in section, of a portion of the hopper and the brick mold of the machine of Figure 1;

Figure 5 is a front elevational view, partly in section, of the brick making machine taken on the line 5—5 of Figure 3;

Figure 6 is a plan view partly in section of the upper portion of the molding apparatus taken on the line 6—6 of Figure 3;

Figure 7 is a fragmentary upward view showing cutters compassing the cores of the brick making machine;

Figure 8:
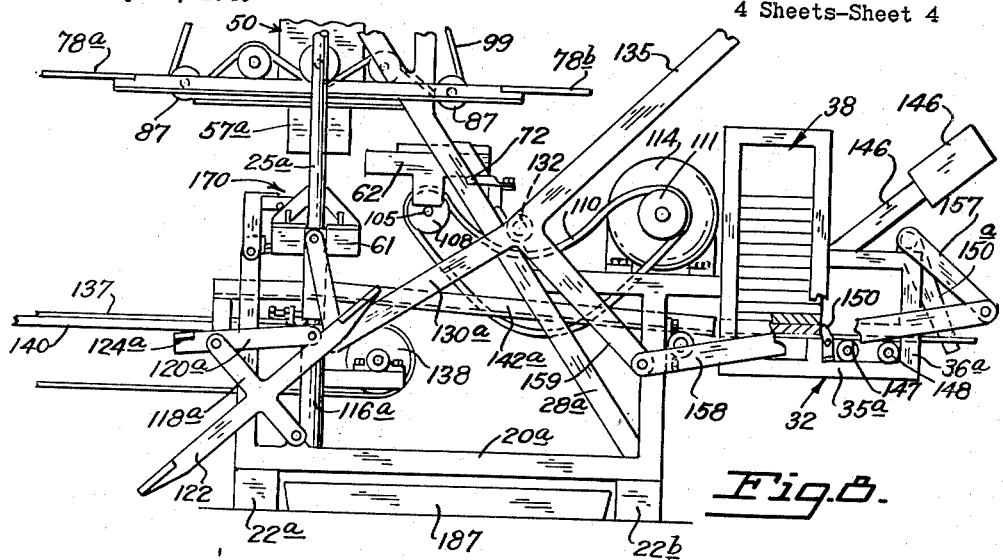
Figure 8 is a side elevational view, partly in section and partly fragmentary, of the brick making machine with the mold withdrawn from the core.

In accordance with the present invention I provide a hopper having a discharge aperture at the bottom thereof and having a core supported therein extending downwardly through the aperture beyond the bottom into a molding region. A mold form is supported in that region in register with the hopper so as to complete a longitudinal space of uniform cross section about the core within the wall of the hopper and the mold form. In practicing the invention, cementitious material to be molded into brick form is fed into an opening at the top of the hopper and sinks therein under the combined action of gravity and vibration. As the cementitious material sinks in the hopper, it is compacted into a predetermined shape about the core and is then fed into the molding space between the core and the mold form.

The section of cementitious material filling the mold form is then severed from that remaining in the hopper by means of transversely movable blades which are adapted to slip between the mold form and the hopper in encompassing relationship to the core, thus cutting off a predetermined portion of cementitious material, and at the same time closing the bottom of the hopper. To facilitate the severing of the brick unit from the material in the hopper, the cutters are vibrated transversely during the cutting operation. The hollow brick unit thus formed within the mold is then removed while the brick unit is still in a somewhat plastic but, nevertheless, firm state. The mold is then replaced and the blades withdrawn again causing preformed compacted cementitious material to be fed from the hopper into the mold again to form another hollow brick. Though many forms of machinery may be devised for manufacturing hollow brick in accordance with the principles of invention, only one embodiment thereof will be specifically described herein.

Referring to the drawing and more particularly to Figures 1, 2, 3, and 5, it is to be noted that the various operating parts of the brick making machine of the present invention are supported on a frame. The frame supports a brick forming mechanism, a platen feed mechanism, a brick discharge mechanism, and a brick conveying mechanism.

Considering first the construction of the frame, it will be noted that it is of open type and comprises two longitudinal side bars 20a and 20b which are interconnected at their ends by bottom cross bars (not shown) and which rest upon cross beams 22a and 22b. The two side bars 20a and 20b support at opposite ends thereof, front upright members 23a and 23b and rear upright members 24a and 24b. A pair of vertically disposed guide rods 25a and 25b are secured to the side bars 20a and 20b at points near the front ends thereof. Two A-braces 26a and 26b are arranged on opposite sides of the frame with their apexes rigidly secured to the tops of the guide rods 25a and 25b respectively. The A-braces 26a and 26b include long, downwardly inclined legs 28a and 28b attached to the frame at the lower rear corners thereof, and short, upwardly inclined legs 29a and 29b, the legs of each brace being connected by vertical cross-straps 30a and 30b respectively.

A platen supply platform 32 is supported beyond the rear of the frame by horizontal arms 33a and 33b which are supported by the long legs 28a and 28b of the A-braces and the rear upright members 24a and 24b. The platform 32 is of open rectangular figuration and comprises a floor including a pair of car rails 35a and 35b on opposite sides and upright members 36a and 36b at the rear thereof which carry at their top ends, horizontally extending side arms 37a and 37b which together with arms 33a and 33b support adjacent the front end of the platform 32, a vertically disposed platen container 38 of uniform rectangular cross section in plan.

The platen container 38 comprises four upright corner members 39—39 interconnected at their tops by four side strap members 40—40 and interconnected at their bottoms by two longitudinally extending stationary platen rails 41a and 41b. These platen rails are located above the floor of the platform 32.

A motor platform 43 of suitable construction is arranged at the front of the rear platform 32 and is rigidly secured to the arms 33a and 33b.

Except for the foundation beams 22a and 22b which are made of wood, the various members of the frame are all composed of metal such as iron or steel. The guide rods 25a and 25b are preferably of circular cross section. The side bars 20a and 20b, the front upright members 23a and 23b, the rear upright members 24a and 24b, the car rails 35a and 35b, the corner members 39—39, and the stationary platen rails 41—41 are preferably made of angle iron.

The brick forming portion of the machine includes a hopper 50 supported by brackets 45a and 45b at the top of the guide rods 25a and 25b and a mold 60 supported on the frame beneath the hopper.

The hopper comprises a funnel 51 at the upper end thereof and an elongated chute 52 at the lower end thereof terminating in a mouth or discharge aperture 53 at the bottom. The chute 52 is of rectangular cross section and comprises relatively wide front and rear walls 54a and 54b and relatively narrow side walls 55a and 55b. A pair of alignment brackets 56a and 56b embracing the guide rods 25a and 25b are rigidly secured to the narrow side walls at the lower end thereof in order to maintain the chute vertical.

Two hollow cores 57a and 57b of uniform square, horizontal, cross-section and closed off at the bottoms, hang in the hopper 50 in spaced relationship to the walls thereof and to each other, being supported from a web structure 58 affixed across the top of the funnel 51. These cores extend downwardly beyond the bottom of the chute into a molding region where hollow bricks are to be molded.

The mold 60 in which the bricks are to be formed comprise a vertically movable mold form 61 and a horizontally or transversely movable mold bottom plate 62. The mold form 61 is of the same rectangular cross section as the chute 52 and comprises front and rear walls 64a and 64b and side walls 65a and 65b and is open at the top and bottom. The mold form 61 is adapted to be positioned directly beneath the bottom of the chute 62 with its walls in register with the walls of the chute 52, and has a height which permits a small space to be formed between its top and the bottom of the chute 52 when the bottom of the mold form lies in the same horizontal plane as the bottom of the cores 57a and 57b, as will be noted by particular reference to Figures 3 and 5.

The mold form 61 is carried by sleeves 68a and 68b bracketed to the side walls 65a and 65b and these sleeves are arranged to slide vertically on the guide rods 25a and 25b, permitting the mold form to be vertically moved between an upper, or molding position in the molding region and a lower or brick discharge position, all as more fully explained hereinbelow.

The mold bottom plate 62 is used with the mold form 61 when the latter is in its upper position. This bottom plate carries a pair of guide rails 69a and 69b at the sides thereof, which rest on a pair of stationary guide rails 70 supported from the long legs 28a and 28b of the A-braces intermediate the ends thereof.

Another pair of guide rails 71a and 71b are carried on the side walls 65a and 65b of the mold form 61 and are adapted to be aligned with the stationary guide rails 70 when the mold form 61 is located in its upper position. With this arrangement, the mold bottom plate 62 may be moved between a rear position on the stationary guide rails 70 to a forward position on the guide rails 71a and 71b carried by the mold form. This movement is accomplished by means of a lever 72 connected to the bottom plate 61 and pivotally supported between the aforementioned A-braces.

The brick forming apparatus also comprises a pair of transversely movable cutter blades 75a and 75b in the plane between the hopper chute 52 and the mold 61 in its upper position, such blades having notches 74 at the inner edges thereof to conform to and permit the same to encompass the cores 57a and 57b when moved inwardly toward each other. These cutting blades are carried by sleeves 76a and 76b which slide on guide rods 77a and 77b extending horizontally across and affixed to the narrow walls of the hopper chute adjacent the lower end thereof. It is to be noted that the cutter blades 75a and 75b are movable between an inner position in which they cooperate with the cores 57a and 57b to close the bottom of the chute 52, and an outer position in which they permit a continuous passage to be formed by the chute and the mold form around the cores enclosed therein.

The movement of the blades is accomplished by means of control arms 78a and 78b which are pivotally attached at their far ends to links 79a and 79b which are in turn pivotally supported on the side wall 55b of the hopper by means of suitable brackets 80a and 80b. The cutter arms 77a and 77b are also pivotally attached to the sleeves 76a and 76b of the cutter blades. The guide rods 77a and 77b are supported on the front and rear walls 54a and 54b and the sleeves 76a and 76b are attached to the cutter blades 75a and 75b midway between their sides, all as illustrated in Figure 6, in order to facilitate balanced transverse movement of the blades 75a and 75b without yawing.

Suitable means are provided for vibrating the hopper and the cores, the knives, the mold form and mold bottom plate. For this purpose two shafts 81 carrying eccentric weights 82 are mounted in bearings on the front and rear walls 54a and 54b of the chute and also two shafts 83 carrying eccentric weights 84 are mounted on bearings on the two cutter blades. All four shafts are arranged above the plane of the cutter blades. Two pulleys 86 are secured to the ends of the first pair of shafts 81 mentioned and two pulleys 87 are secured to the ends of the second pair of shafts 83 in alignment with the other pulleys and an idler pulley 88 mounted on the chute.

An electric drive motor 90 is provided having a driving pulley 91 arranged in the plane of the driven pulleys 86 and 87. This drive motor is mounted directly over the hopper on a platform 93 which is pivotally supported between the upper ends of the short legs 29a and 29b of the A-braces. The motor is counterbalanced by a counterweight 94 arranged on the platform 93 on the opposite side of the pivot. The counterweight 94 is assisted by a normally open compression spring 95 arranged between the platform 93 on a horizontal cross piece 96 attached to the vertical cross straps 30a and 30b on the A-braces. A bolt 97 extends through the compression spring 95; the bolt 97 is secured at one end to the platform 93 and passes through a bore in the cross piece 96, and has a stopping nut 98 attached to the lower end thereof.

In order to drive the eccentric-carrying shafts 81 and 83, a belt 99 is threaded between the driving pulley 91 and the driven pulleys 86 and 87 and the idler pulley 88. The driven pulleys 86 and 87 are considerably smaller than the driving pulley 92 in order to produce a low amplitude high frequency vibration of the hopper 50 and the cores 57a and 57b and the cutter blades 75a and 75b.

It is to be noted that variable take-up is provided for the belt 99 by virtue of the pivotal arrangement and counterweighting of the platform 93 so that the hopper, the cores, and the cutter blades may be vibrated at all times.

An angle iron bar 100 is rigidly secured to the guide rod 25a and the A-brace 26a in the path of inward movement of the cutter arms 78a and 78b, and is provided with a notch 103 at each end to properly limit the inward extent of travel of the cutters and provide a support for each arm, in such position.

In order to vibrate the mold form 61 and the mold bottom plate 62, a shaft 105 is mounted transversely thereof in a bearing 106 extending downward from the bottom plate 62 and this shaft 105 carries eccentric weights 107. The shaft 105 carries at one end a pulley 108 which is driven from a belt 110 by a driving pulley 111 mounted on an electric motor 114 which is supported on the motor base 43. Suitable means may be provided to permit take-up of this belt 110 during the lateral movement of the mold bottom plate 62 from its functioning position under the mold to its non-functioning position, but in the absence of such take-up means, the belt will drape itself about its associated pulleys when the bottom plate is moved to its non-functioning position. It is to be noted that vibration is communicated to the mold form from the mold bottom plate by virtue of the fact that the mold bottom plate hangs from the mold form when the bottom plate is in functioning position.

The mechanism for locking the mold 60 in molding position comprises a pair of locking sleeves 116a and 116b arranged to slide vertically on the guide rods 25a and 25b directly beneath the sleeves 68a and 68b which support the mold form 61. These locking sleeves are raised and lowered on their guide rods by means of two toggle linkages arranged on opposite sides of the frame.

These toggle linkages comprise crank arms 118a and 118b pivotally supported on the side bars 20a and 20b of the frame and rigidly interconnected along the axis of rotation by means of a shaft 119. The toggle linkages also comprise lift arms 120a and 120b pivotally connected at their lower ends to the upper ends of the crank arms 118a and 118b respectively, and pivotally connected at their upper ends to the locking sleeves 116a and 116b respectively. One of the crank arms 118a has a cross arm 122 rigidly secured transversely thereto to facilitate operation of the toggle linkages by foot. The locking sleeves 116a and 116b are lowered by pressing downward on the forward end of the cross arm 122 and are raised by pressing downward on the rear end of this cross arm.

When raised, the toggle linkages are locked in an extended position by means of detents 124a and 124b attached to the lower ends of the lift arms 120a and 120b and adjacent the crank arms 118a and 118b on the forward sides thereof The locking sleeves 116a and 116b carry upwardly projecting brackets 125a and 125b on the forward sides thereof on which are mounted two adjusting screws 126a and 126b and lock nuts associated therewith. These adjusting screws are horizontally adjustable in the direction of the longitudinal axis of the frame and serve to limit the forward movement of the mold bottom plate 62 by engagement with centering legs 127a and 127b extending downwardly therefrom.

The upper ends of the locking sleeves 116a and 116b are interconnected by a cross bar 128 which cooperates with the shaft 119 interconnecting the toggle linkages for raising and lowering the two locking sleeves 116a and 116b in unison. When the locking sleeves engage the mold form guiding sleeves 68a and 68b, in their uppermost position, the mold form 61 is supported in proper registry with the chute 62. With the mold form 61 in this position the mold bottom plate 62 may be moved into position to close the lower end thereof, thus establishing a brick mold 60 enclosing the extended ends of the cores as illustrated in Figure 4.

The raising and lowering of the mold form is further controlled by means of a pair of lifting cranks 130a and 130b which are pivotally supported on the long legs 28a and 28b of the A-braces externally of the frame and which are connected to the mold form sleeves 68a and 68b by links 131a and 131b. These two cranks are interconnected at their points of rotation by means of a shaft 132 to which both are rigidly secured. These cranks 130a and 130b are rotated about their pivots by means of an elongated rearwardly extending handle 135 formed unitary with one of the cranks 130a.

A conveyor belt 137 is arranged for longitudinal movement beneath the brick discharge position of the mold form 61. This belt is driven by a motor (not shown) over a pulley 138 supported between bearings carried on brackets 139 which are supported on the front upright members 23a and 23b of the frame. The upper portion of the belt 137 rests upon a platform 140 which extends into the front end of the frame with its upper surface tangent to the pulley 138. The belt is so driven that its lower portion moves toward the frame and its upper portion moves away from the frame.

A mechanism is provided for feeding a series of platens sequentially into brick receiving position directly beneath the discharge position of the brick mold form 61, and above the conveyor belt 137. This mechanism comprises a supply of platens stacked in the platen container 38 on the rear platform 32 and includes a pair of guide rails 142a and 142b disposed within the frame on opposite sides of the belt 137 and pivotally supported on the rear upright members 24a and 24b of the frame.

These guide rails terminate in depending sections 145a and 145b, the lower ends of which are interconnected by means of a cross bar 144a arranged beneath the belt platform 140. A cross bar 144b across the rails and affixed thereto, serves to rigidify the rail assembly.

The guide rails 142a and 142b are connected to a rearwardly extending arm 146 having a weight 143 at the end thereof for pivotally holding the forward end of the guide rails 142a and 142b in their uppermost position.

The platen feed mechanism also includes a pusher plate 147 provided with wheels 148 which ride on the floor rails 35a and 35b, and permit of movement of the pusher plate between a forward position directly beneath the platen container 38 and a rearward position behind it. The plate 147 carries a weighted pivoted trip 150 at the forward end thereof which is adapted to swing into a horizontal position and permit withdrawal of the plate from its forward position beneath the platen container 38. When the pusher plate is drawn to its rearward position, the finger 150 is adapted to right itself to a position where it will catch the lowermost platen in the container 38 and push it forward onto the guide rails 142a and 142b when the plate 147 is again moved to its forward position beneath the stack of platens.

The mechanism for controlling the movement of the plate 147 comprises a downwardly inclined finger lever 150a pivotally supported on a shaft 151 at the rear side of the platform 32. The finger lever is arranged with its engaging end in a slot in a tongue 154 extending rearwardly of the plate 147 and rigidly attached thereto.

The shaft 151 is rotated by means of a crank 157 which is connected to a link 158 which in turn is pivotally connected to a crank arm 159 unitary with the mold lift crank arm 130a and the control handle 135.

It is to be noted that the mold lift crank arm 130a and the plate actuating crank arm 157 and the handle 135 are interconnected so that when the handle 135 is raised, the mold form 61 is moved from its molding position to its discharge position in contact with a platen and simultaneously therewith, the plate 147 is moved from its front position to its rear position.

Subsequently when the control handle 135 is lowered, the mold form 61 is raised from its discharge position to its molding position and the pusher plate is moved forward and pushes a platen onto the platen guide rails. The latter platen pushes other platens forward on the guide rails 142a and 142b thus pushing a platen into brick receiving position beneath the discharge position of the mold form 61.

A stripper 170 is provided to assist in the discharge of bricks from the brick mold form 61 onto a platen. Such stripper comprises a pair of substantially C-shaped arms 171a and 171b which are pivotally supported at the upper ends of the front upright members 23a and 23b. These are rigidified by a cross member connecting intermediate points thereof, and a pressure bar 176 of angle iron joining the free ends of said arms. A second pair of arms 172a and 172b are pivotally connected to said first arms between said cross member and pressure bar and are similarly connected at their free ends by a pressure bar 177. This second assembly is normally biased to an open position with respect to the first arms 171a and 171b by a spring 173 interengaging said cross member and said pressure bar 177.

A stop pin on one of the arms determines the maximum open position to which the spring may spread the stripper arms. The pressure bars are so disposed that with the stripper in its normally open condition, each has a surface lying in a common plane.

Figures 11, 12, 13:
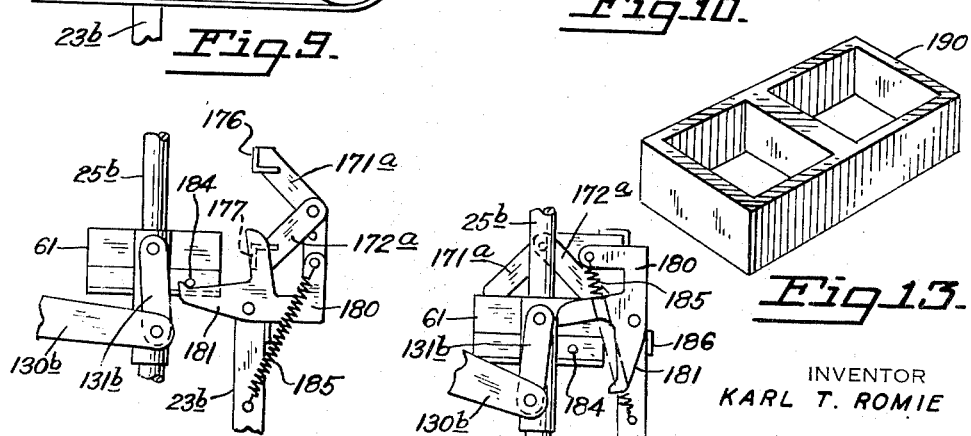
Figures 11 and 12 are detailed fragmentary views of a portion of the molding apparatus and the stripper; and, Figure 13 is an isometric view of a hollow brick made with this machine.

The stripper is movable between a retracted position illustrated in Figure 11 and a stripping position illustrated in Figure 12. The desired control is achieved by means of a pivoted bell-crank 180 having two arms 181 and 182 thereon which cooperate with a pin 184 projecting from a side wall of the mold form 61. A holding spring 184 is so connected between the bell-crank 180 and the front upright member 23b as to move the bell-crank away from dead center in either direction.

The operation of the stripper may be readily understood by particular reference to Figures 9, 10, 11 and 12. Thus, when the mold form 61 is lowered toward its discharge position, the pin 174 carried on the mold form 61 engages the arm 181 of the bell-crank 180 pressing it downward first against the tension of the spring and then with the aid of the spring 184 after the bell-crank passes dead center. As a result the pressure bars 176 and 177 are brought into register with the top surfaces of the walls of a hollow brick unit 190 in the mold form 61 as illustrated in solid line in Figures 9 and 10.

Subsequently, when the mold form 61 is raised, it moves upward while the stripper 170 remains stationary and holds the brick unit 190 stationary, thus causing the brick unit to be discharged from the mold form 61.

During continued upward movement of the mold form, the pin 174 carried thereon engages the second arm 182 of the bell crank and swings the stripper into its forward, retracted position where the bell crank 180 comes to rest against a stop 185 projecting sidewise from the front upright member 23b.

It is to be noted in this connection that during this swinging movement of the stripper, the second arms 172a and 172b carrying the second pressure bar, press against a front wall 64a of the mold form 61 and are thus urged against the tension of the spring 173 into a position which permits the stripper 180 to be readily drawn from the mold form 61.

A drip pan 187 is located on the floor between the cross beams 22a and 22b to catch loose concrete mix.

To prepare the machine described, for operation, the rails 142a—142b are initially hand loaded with platens, the first 195 being disposed beneath the discharge position of the mold form. A series of platens are stacked in the container 38 upon the stationary rails 41a and 41b, and constitute a reserve supply to be fed automatically onto the rails 142a—142b, to maintain such rails loaded so long as the supply of platens holds out. The mold form 61 is locked in molding position about the extended ends of the cores 57a and 57b and the mold bottom plate 62 moved into its forward position in engagement therewith. The cutter blades 75a and 75b are moved into a position closing the mouth 53 of the hopper 52.

With the machine thus prepared a concrete mix in a thick plastic state is then poured into the funnel 51 at the top of the hopper 50 and the mix is permitted to settle within the chute 52 and into the space surrounding the cores 57a and 57b. The motors 91 and 114 are then energized and also the motor (not shown) which drives the conveyor belt 137. The energization of the two motors 91 and 114 causes the mold form 61, the mold bottom plate 62, the cutter blades 75a and 75b, the hopper 50, and the cores 57a and 57b to vibrate as hereinabove explained. The vibration of the hopper 50 and the cores 57a and 57b causes the concrete mixture in the hopper 50 to be compacted and to assume the form of the space in the hopper surrounding the cores 57a and 57b.

After the concrete within the hopper 50 has been precompacted to the desired degree, the cutter arms 77a and 77b are moved outward, thus withdrawing the blades 75a and 75b from the mouth of the chute and permitting the preformed concrete mix to slide into the mold 60 until stopped by the mold bottom plate 62. It is to be noted that the vibration of the cutting blades 75a and 75b during the withdrawal operation permits the blades to be detached readily from the bottom surface of the preformed body of concrete mix without disturbing that surface.

The vibration of the hopper 50 and the cores 57a and 57b assist gravity in causing the concrete mix to slip into the mold. The continued vibration of the mold causes the material filling the molding space therein to assume a uniform consistency free of air pockets. After the mold form has been filled, the cutter arms 77a and 77b are then pushed inward so as to cause the cutter blades 75a and 75b to sever the mixture in the mold from that remaining in the hopper. The vibration of the cutter blades 75a and 75b during this operation facilitates such severance.

After a brick unit 190 has been formed in the mold, the mold bottom plate is withdrawn to its rearward position. The vibration of this bottom plate assists in its detachment from the brick unit 190. The consistency of the material in the brick unit 190 at this time however, is such that it does not fall out of the mold form.

After the mold bottom plate has been removed, the toggle linkages are moved to their collapsed position thus unlocking the mold form. The handle 135 is then pushed upward, thus causing the mold form to be lowered with the brick unit therein to its discharge position. As the mold form is lowered the brick unit is detached from the cores 57a and 57b, this detachment being assisted by the vibration of the cores 57a and 57b.

Figures 9, 10:
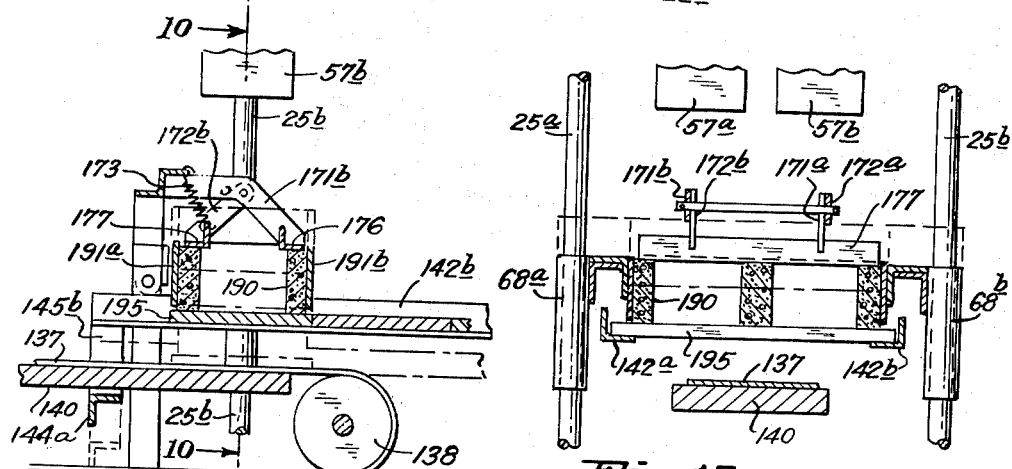
Figure 9 is a fragmentary elevational view, partly in section, illustrating the action of the stripper of the brick making machine in discharging a brick from the mold form.
Figure 10 is a fragmentary elevational view partly in section taken on the line 10—10 of Figure 9.

As the mold form is thus lowered to its discharge position, the stripper 170 is engaged, as hereinabove described, and the pressure bars 176 and 177 thereon register with the top surfaces of the forward and the rear walls 191a and 191b of the brick as illustrated in Figure 9.

Subsequently when the mold for 61 is raised, the hollow brick is discharged onto the platen 195. The weight of the brick on this platen is sufficient to cause the guide rails 142a and 142b to be lowered by gravity and thus permit the loaded platen to engage the belt 137 and be carried forward thereon as indicated in Figure 3.

As the upward movement of the mold form occurs, the pusher plate 147 is moved forward in the rear platform 32 causing a platen to be withdrawn from the lowermost position in the container 38 and press the other platens on the guide rails 142a and 142b forward, thus to place another platen in the brick receiving position beneath the discharge position of the mold form. If perchance the loaded platen has not previously been removed from the guide rails 142a and 142b because of friction between that platen and the guide rails, the loaded platen is now discharged from the guide rails onto the belt 137 by virtue of the platen feeding action described. When the loaded platen is discharged, the guide rails 142a and 142b are automatically raised to their uppermost position by the weight 147.

After the mold form has been moved into its uppermost position, the toggle linkages are moved into their most extended position in locking engagement with the mold form. Then the mold bottom plate is moved forward into a position beneath the mold form and the mold is again ready to receive a batch of preformed concrete mix from the hopper.

To form the second hollow brick, the cutting blades 75a and 75b are again withdrawn from the mouth of the hopper and the preformed precompacted concrete mix again permitted to slide into the mold as hereinbefore described. After the mold is again filled, the concrete mix is severed by moving the blades 75a and 75b together in a closing relationship over the mouth of the hopper and a second brick unit is thus formed. This brick unit is discharged onto a second platen in the manner previously described and the entire process is repeated again and again to manufacture a supply of hollow bricks.

From the foregoing description of my invention it will be clear that I have provided a machine for making hollow bricks efficiently by virtue of the fact that the mix from which the hollow bricks are to be made is preformed and precompacted before being fed into a brick mold. It will also be clear that the efficiency achieved by this machine results partly from the fact that the cores extend through the hopper into the molding region, and also by virtue of the fact that various portions of the apparatus, especially the cores and the bottom plate and the cutter blades are vibrated during the movement thereof relative to the body of the concrete mix, thus facilitating the severance and detachment of these portions from the brick unit formed in the mold.

It is also clear that the efficiency of the brick making machine described is enhanced by the mechanism which coordinates the brick discharging operation and the platen feeding operation. With the machine described the manufacture of hollow brick is greatly speeded up by the fact that a series of hollow bricks are made from a preformed precompacted supply of concrete mix.

Although but one embodiment of my invention has been illustrated and described, it will be obvious that further changes and modifications in the form and relative arrangements of the parts and the material used, may be made without departing from the true scope and spirit of my invention.

While I have stressed, in the foregoing description of a preferred embodiment of my invention, the manufacture of hollow bricks or blocks, it becomes a simple matter to convert the machine to the manufacture of solid items, merely through the removal of the core from the hopper.

Reference is, therefore, made to the appended claims for a definition of the limits of the invention.

I claim:

1. In apparatus for manufacturing hollow brick, a hopper having a discharge aperture at the lower end thereof, a core fixedly supported within said hopper and extending downwardly through said aperture beyond the lower end thereof for preforming a supply of cementitious material in the space in said hopper surrounding the core, a brick mold, and means for supporting said brick mold about the extended end of said core, whereby a molding space is formed therein about the end of said core.

2. In apparatus for manufacturing hollow brick, a hopper having a discharge aperture at the lower end thereof, a core fixedly supported within said hopper and extending downwardly through said aperture beyond the lower end thereof for preforming a supply of cementitious material in the preforming space in said hopper surrounding the core, means for vibrating said hopper and said core, a mold form, means for supporting said mold form about the extended end of said core, a mold bottom plate, means for supporting said mold bottom plate on the bottom of said mold form in closing relationship thereto, whereby a molding space is formed in said mold form about the extended end of said core, and means for vibrating said bottom plate and said mold form.

3. In apparatus for manufacturing hollow brick, a hopper having a discharge aperture at the lower end thereof, a core fixedly supported within said hopper and extending downwardly through said aperture beyond the lower end thereof for preforming a supply of cementitious material in the preforming space in said hopper surrounding the core, means for vibrating said hopper and said core, a brick mold, means for supporting said brick mold about the extended end of said core whereby a molding space is formed in said mold form about the extended end of said core, means including a gate disposed in a plane between said hopper and said mold form for closing said aperture, means for withdrawing said gate from said aperture to release preformed cementitious material from said preforming space into said molding space, means for returning said gate to its initial position to sever the cementitious material in said molding space from the cementitious material remaining in said hopper, and means for vibrating said gate.

KARL T. ROMIE.

REFERENCES CITED

The following references are of record in the file of this patent:

UNITED STATES PATENTS

| Number | Name | Date |
|---|---|---|
| 1,029,559 | Pauly | June 11, 1912 |
| 1,376,321 | Crozier | Apr. 26, 1921 |
| 1,573,346 | Kissam | Feb. 16, 1926 |
| 1,733,706 | Widin | Oct. 29, 1929 |
| 1,921,003 | Romie | Aug. 8, 1933 |
| 2,136,009 | Holland, Jr. | Nov. 8, 1938 |
| 2,360,122 | Gelbman | Oct. 10, 1944 |